Dec. 13, 1932.  H. A. LEWEKE  1,890,737
ELECTRIC AUTOMATIC PEANUT COOKER
Filed March 10, 1931  6 Sheets-Sheet 3

Inventor
H. A. Leweke
By Watson E. Coleman
Attorney

Dec. 13, 1932.       H. A. LEWEKE       1,890,737
ELECTRIC AUTOMATIC PEANUT COOKER
Filed March 10, 1931     6 Sheets-Sheet 4
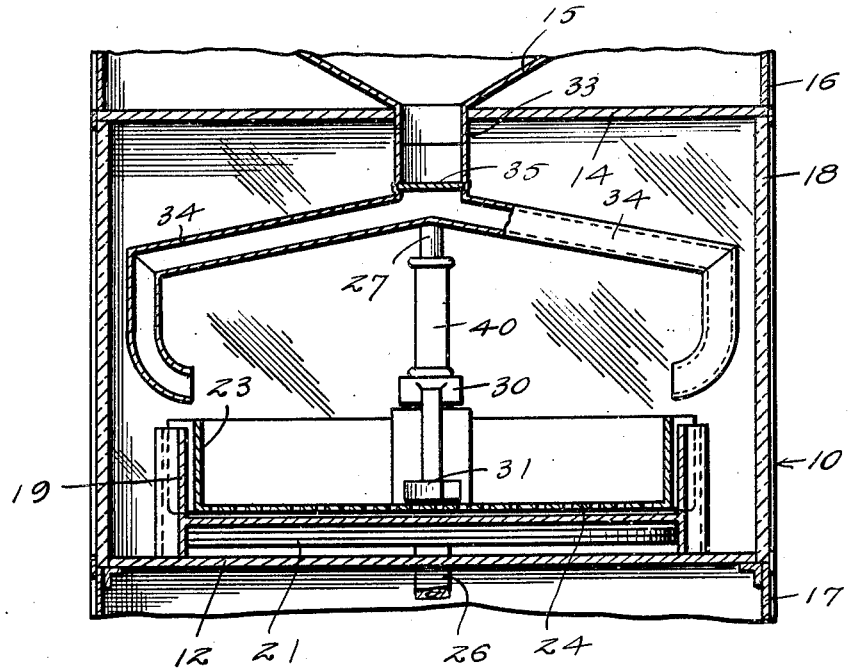
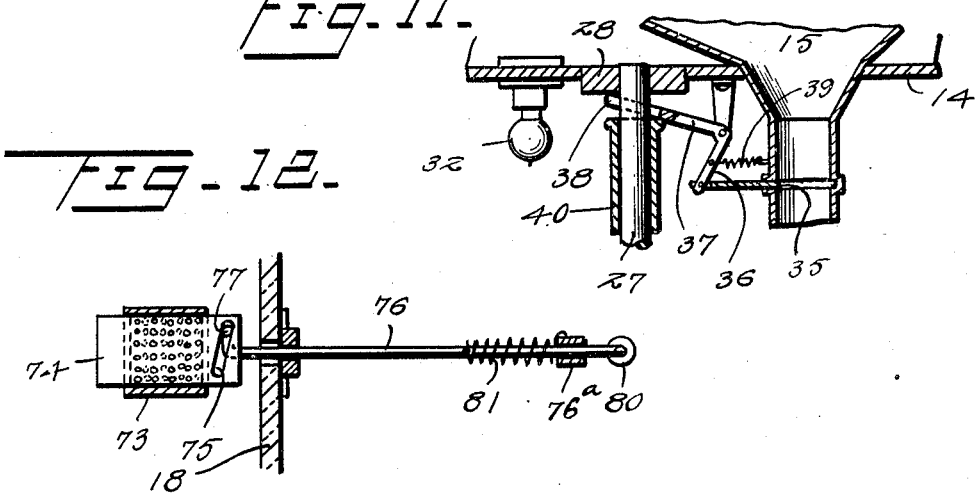
Inventor
H. A. Leweke
By Watson E. Coleman
Attorney Dec. 13, 1932.  H. A. LEWEKE  1,890,737
ELECTRIC AUTOMATIC PEANUT COOKER
Filed March 10, 1931   6 Sheets-Sheet 5

Inventor
H. A. Leweke
By Watson E. Coleman
Attorney

Dec. 13, 1932.  H. A. LEWEKE  1,890,737
ELECTRIC AUTOMATIC PEANUT COOKER
Filed March 10, 1931   6 Sheets-Sheet 6
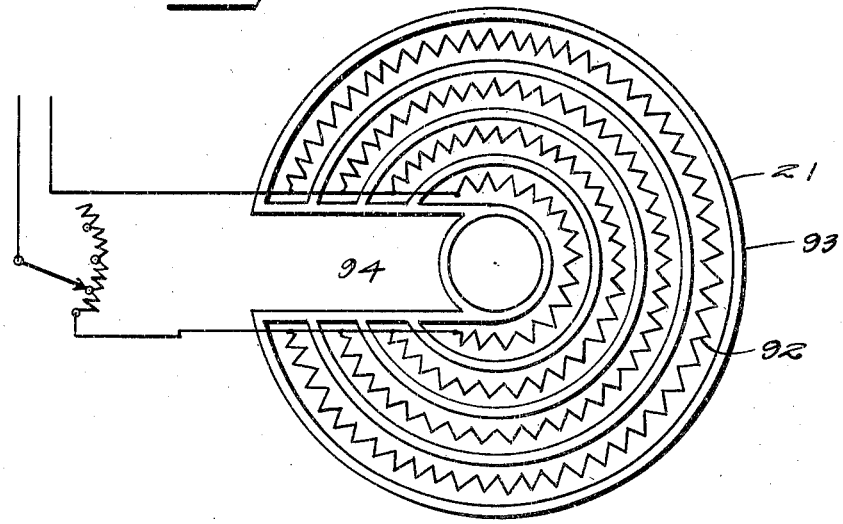
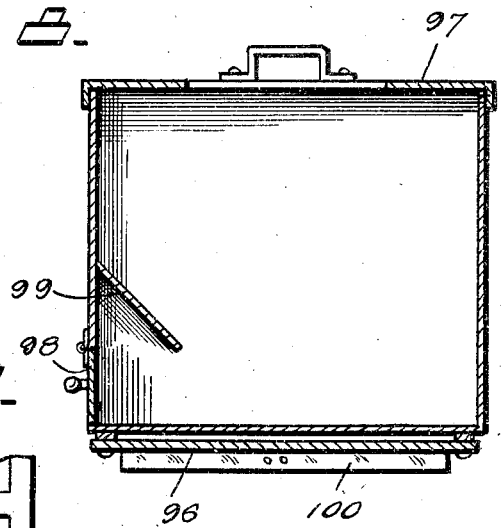
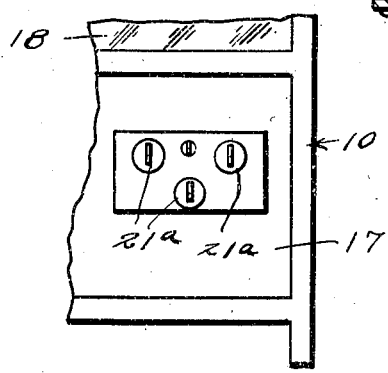
Inventor
H. A. Leweke
By Watson E. Coleman
Attorney Patented Dec. 13, 1932

1,890,737

UNITED STATES PATENT OFFICE

HAROLD A. LEWEKE, OF GREENVILLE, MICHIGAN

ELECTRIC AUTOMATIC PEANUT COOKER

Application filed March 10, 1931. Serial No. 521,562.

This invention relates to means for roasting peanuts and particularly to means for roasting peanuts in oil or butter.

At the present time, peanuts are roasted either dry in a peanut roaster and then placed in cocoanut oil and the peanuts salted or the peanuts are placed in large kettles of a double boiler type to be cooked in the oil or butter which requires a constant stirring with large wooden paddles. Of course, peanuts so cooked are shelled or raw peanuts.

The general object of the present invention is to provide an entirely automatic machine which automatically discharges the charges of raw peanuts into a cooking receptacle immersed in cooking oil or butter, which automatically stirs the peanuts constantly while they are being cooked, then lifts them from the cooking medium, which may be butter, but which will hereafter be termed "oil", allows them to drain and empties them from the machine.

A further object is to provide means for automatically salting these peanuts as they leave, such means being adjustable so as to provide for a greater or less salting action.

A further object is to provide means for automatically replenishing the cooking receptacle with definite charges of peanuts after the cooked peanuts have been discharged and to provide means for automatically replenishing the cooking receptacle with oil or butter to replace all which has been carried away or absorbed by the previous load of peanuts.

A further object is to provide electrical means for cooking the peanuts in the oil of such character that the heat may be regulated to the specification of the operator and generally speaking to provide a machine of this character which will thoroughly boil a definite charge of peanuts and apply thereto a definite charge of salt and in which there will be no guess work as to the length of time the peanuts are cooking nor as to salting, thus producing an even finished product where each batch will be consistent with any other batch.

A further object is to provide a peanut cooker of this kind in which the peanuts, as they are cooked, may be observed and the operation of the mechanism be observed through the transparent sides of the casing.

Other objects will appear in the course of the following description.

My invention is illustrated in the accompanying drawings, wherein:—

Figure 4 is an enlarged fragmentary section on the line 4—4 of Figure 1;

Figure 8 is a section on the line 8—8 of Figure 1;

Figure 9 is a diagrammatic plan view of the heating element;

Figure 10 is a fragmentary elevation of the machine showing the switch panel and switches;

Figure 11 is a fragmentary section in the same plane as Figure 1 showing the feed valve opened;

Figure 12 is a fragmentary section on the line 12—12 of Figure 1;

Figure 1:
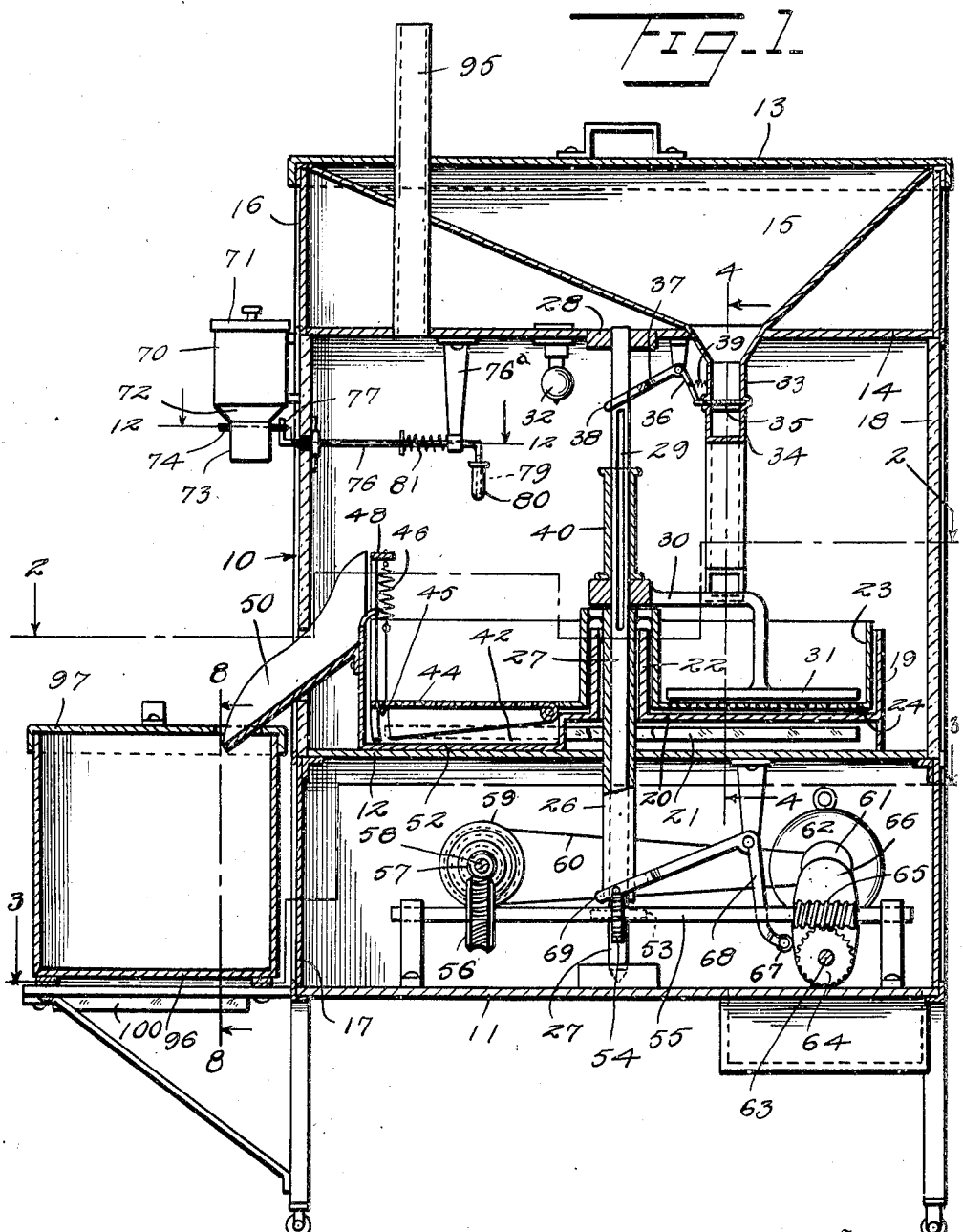
Figure 1 is a vertical section transversely through the machine.
Figure 2:
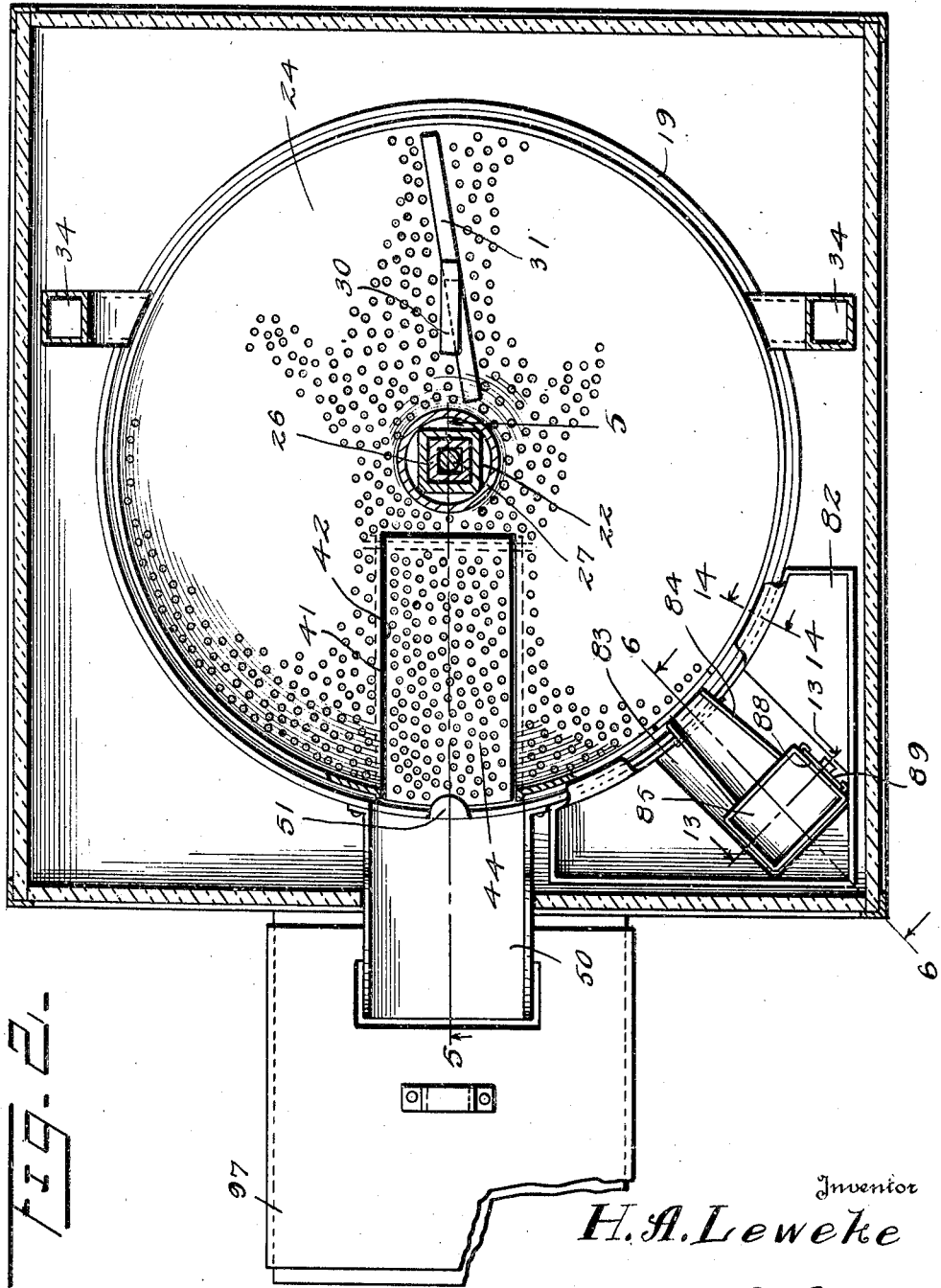
Figure 2 is a section on the line 2—2 of Figure 1.
Figure 3:
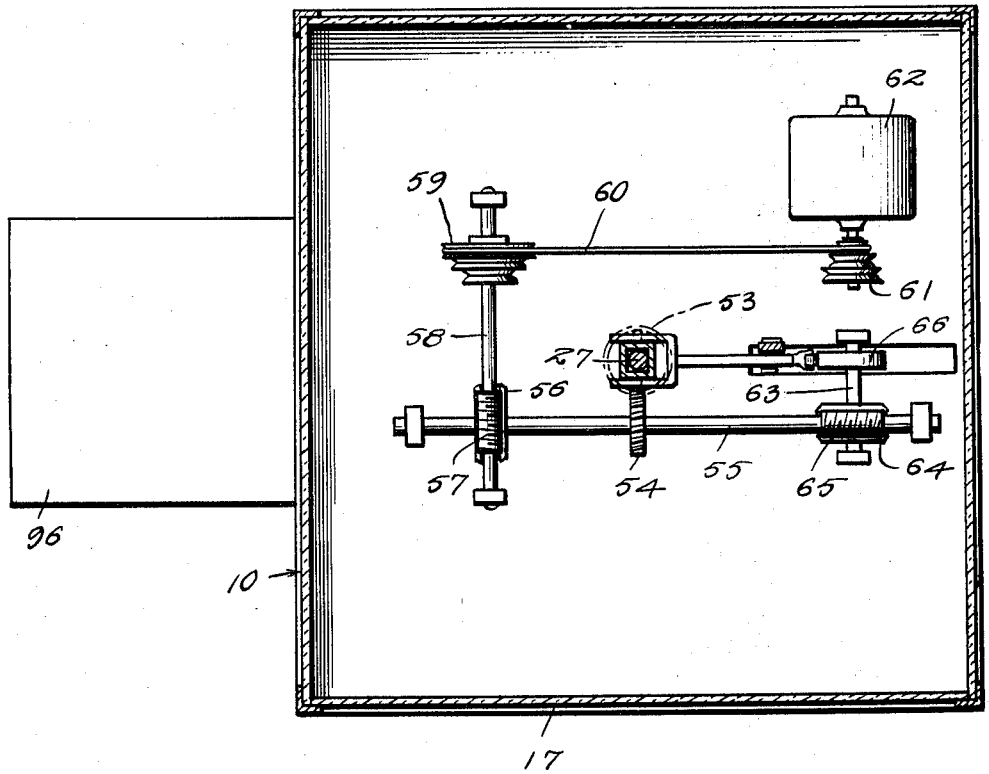
Figure 3 is a section on the line 3—3 of Figure 1.
Figure 7:
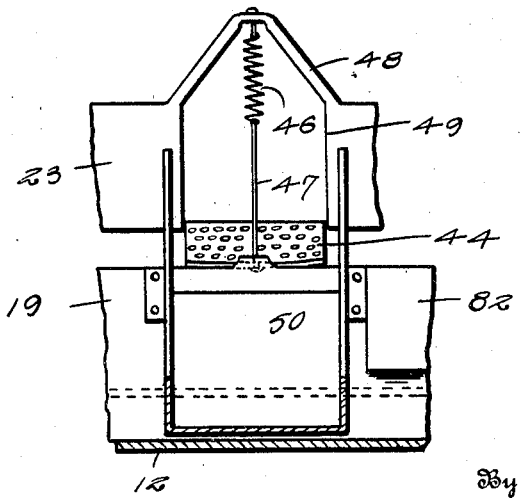
Figure 7 is a fragmentary section on the line 7—7 of Figure 5.

Referring to these drawings, 10 designates the frame of an outer casing which is illustrated as being rectangular in form, though any other suitable form might be used. This outer casing is provided with a lower floor or wall 11, an upper wall 12, which with the lower wall defines a compartment wherein the driving mechanism is disposed, a top wall 13 or cover and a wall 14 below the top wall, this wall 14 supporting the hopper 15 which is filled with nuts. The compartment formed between the walls 11 and 12 is also preferably closed by a metallic panel 17 but the compartment between the walls 12 and 14 is preferably enclosed by glass panes or walls 18.

The front glass panel 18 is removable as is the front panel 17.

Mounted upon the floor 12 or in any other suitable manner is a cooking receptacle designated generally 19 which is circular in form and which has a bottom 20. Disposed between this bottom 20 and the floor 12 are electrical heating elements 21 of any suitable kind having three heats or three sets of electrically connected heating members, the heat being controlled by switches 21a on the usual switch panel. The bottom 20 of the cooking receptacle 19 has an upwardly extending inner wall 22 preferably defining an opening which is square or many-sided in cross section.

Disposed within the cooking receptacle 19 is a nut carrying basket 23 which is annular in form. This may have and preferably does have an imperforate side wall and a perforated bottom wall 24. The inside wall of the nut basket extends upward and is connected by a spider 25 to a vertically disposed sleeve 26 which is also many-sided in cross section. This sleeve is slidingly mounted upon a vertical shaft 27 which extends upward from the floor 11 through the central opening of the floor 12 and is supported at its upper end in the floor 14 by means of the bearing 28. This shaft is formed with a longitudinally extending spline 29. It will be seen that when the sleeve 26 is raised, the basket 23 will also be raised, and vice versa.

Mounted upon the shaft 27 above the sleeve 26 is an arm 30 which extends radially outward from the shaft and then downward and carries at its lower end a stirrer blade 31 which is supported slightly above the bottom of the basket when the arm and the basket are in lowered position and which is preferably inclined to a line extending radially from the axial center of the basket.

The arm 30 has sliding engagement on the shaft 27 but is rotatable with this shaft, the arm being provided with a key-way receiving a key or spline 29 on this shaft. It will thus be seen that when the sleeve 26 is raised, the nut basket and the arm 30 will also be raised and that when the sleeve is lowered, the nut basket and arm will be lowered. The means for intermittently raising the nut basket will be later described. In order to illuminate the chamber containing the nut basket, I provide the electric light 32.

For the purpose of discharging a predetermined amount of nuts into the nut basket, I provide a hopper 15 disposed in the compartment defined by the floor 14 and the top 13. This hopper has a discharge spout 33 which divides into two discharge branch spouts or ducts 34 which extend laterally and then downward as shown in Figure 4 and have their lower ends extended inward so that the lower ends are nearly flush with the vertical walls of the basket 23. When the basket 23 is raised, therefore, these vertical walls of the basket 23 cut off the discharge through the branches 34 but when the basket is lowered, the discharge from these branches 34 is permitted, the branches 34 being of such size as to hold a predetermined amount of nuts just sufficient to form a proper charge for one cooking or for the basket 23.

The spout 33 above the branches 34 is provided with a sliding valve 35 sliding in suitable guides, the extremity of this valve being disposed beyond the duct and engaged by the downwardly extending arm 36 of a bell crank lever 37. The bell crank lever has its outwardly extending arm forked as at 38 loosely embracing the shaft 27. A spring 39 acts to force the sliding valve 35 inward to its closed position. Slidingly mounted upon the shaft 27 is an elongated sleeve 40 which at its lower end bears upon the arm 30.

This sleeve 40 is entirely free from the arm 30 and entirely free from engagement with the shaft 27 except that it slides up and down upon this shaft. The under face of the fork 38 is preferably rounded or convexed so that it will engage in all positions with the upper end of the sliding sleeve 40. It will thus be seen that when the basket 23 and the arm 30 are raised, the sleeve 40 will be raised and after a certain movement will engage the fork 38, causing the bell crank 37 to retract the valve 35. At this time, the outer wall of the basket 23 has closed the lower ends of the ducts 34 and thus these ducts fill each with a charge of nuts from the hopper. As the basket returns, however, to its lowered position, the valve 35 will close under the action of the spring 39, this closing action taking place just before the side wall of the basket 23 uncloses the lower ends of the ducts 34. When the basket has been fully lowered, therefore, the nuts within the ducts 34 will pour into the basket and the basket will thus be replenished with a charge of nuts.

For the purpose of discharging the cooked nuts from the basket when the basket is raised, I form a trap door opening 41. This opening is rectangular in form and extends from a point adjacent the center of the basket radially outward. This opening is defined by downwardly extending walls 42 which are vertically slotted as at 43. Hinged within this opening is the trap door 44 which, of course, has a rounded outer edge conforming to the circumference of the basket. This door has laterally projecting pins 45 which engage in the slots 43. The trap door is held up into a position flush with the bottom of the basket by means of a coiled contractile spring 46, the lower end of which has a linked connection to the door as at 47 and the upper edge of which is supported by means of the V-shaped brace 48 attached to the walls of the opening 49 which is formed in the side wall of the basket just above this trap door.

Disposed to extend downward and outward from the cooking receptacle or tank 19 is a chute 50 and the upper end of this chute carries a lip 51 which is disposed to extend over the path of movement of the outer margin of the trap door 44 when the trap door is raised. It will be seen that under normal circumstances the trap door is flush with the bottom of the basket when the basket is lowered. When the basket is raised, however, so that its bottom is on a level with the upper end of the chute, the lip 51 will engage with the free edge of the door and as the basket continues its upward movement, the trap door will be pulled down forming an inclined surface down which the nuts will slide. The nuts are forced down over the trap door by the rotation of the agitator blades 31. When the basket is lowered, the trap door will, of course, close under the action of the spring 46 and, of course, the side wall of the cooking tank or receptacle 19 will close this opening 49 when the basket has been fully lowered.

Of course, the bottom of the cooking receptacle is formed with a depression 52 which accommodates the downwardly extending flanges 42 when the basket is fully lowered within the cooking receptacle.

For the purpose of driving the shaft 27 and intermittently raising and lowering the nut basket and allied parts, I provide the following mechanism:—

Mounted upon the shaft 27 is a spiral gear 53. This is engaged by a spiral gear 54 mounted upon a shaft 55. The shaft 55 carries upon one end the worm wheel 56 engaged by a worm 57 upon a transverse shaft 58.

This shaft 58 carries upon it a large band wheel or pulley 59 and, of course, the shaft 58 is mounted in suitable bearings in the casing of the machine. Engaging the band wheel 59 is a belt 60 which is driven from a small band wheel 61 mounted upon the motor 62. This motor 62 will make ordinarily 18 hundred R. P. M. The relative diameters of the wheels 61 and 59 is such, however, that the shaft 58 will have a much slower rotation than the shaft of the motor and in turning the worm 57 and worm wheel 56 will give a much slower rotation to the shaft 55. Preferably, this shaft 55 will have a rotation of 10 R. P. M., thus giving a rotation of 10 R. P. M. to the shaft 27. Thus the arm 30 rotates within the cooking basket 10 times a minute. For the purpose of lifting the sleeve 26 and thus lifting the basket and the arm at predetermined intervals, I provide a shaft 63 having thereon a worm wheel 64 engaged by a worm 65 on the shaft 55. This shaft 63 carries upon it a cam 66. This cam in its rotation engages with a roller 67 mounted on a bell crank lever 68 disposed within the driving mechanism compartment, this bell crank lever having a relatively long arm formed with a fork 69 at one end pinned to the lower end of the sleeve 26. The shaft 63 is so speeded down by reason of the worm and worm wheels 64 and 65 that the cam has a rotation of only 1/9th R. P. M., or in other words, it will make a complete rotation in about approximately nine minutes. Therefore, every nine minutes, the nut basket will be raised from the cooking tank or receptacle and the charge of nuts will be discharged on to the chute 50 and the basket lowered. The cam is so designed that a certain amount of dwell will be provided for when the basket is raised which will make certain that all of the nuts are discharged from the nut basket before the nut basket is again lowered.

I have illustrated a plurality of band wheels 59 disposed upon the shaft 58, these band wheels being of different sizes so that different speeds of the mechanism may be secured and thus this cooking device made applicable to the cooking of different kinds of nuts or other food items by simply placing the belt on the proper pulley combination.

Figure 5:
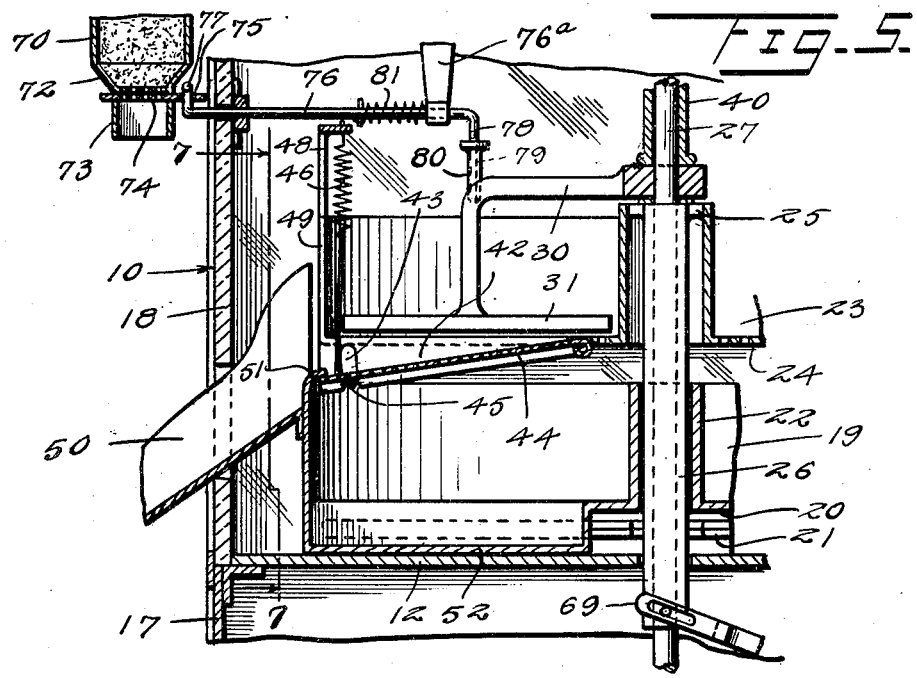
Figure 5 is a vertical section on the line 5—5 of Figure 2, but showing the basket raised.
Figure 6:
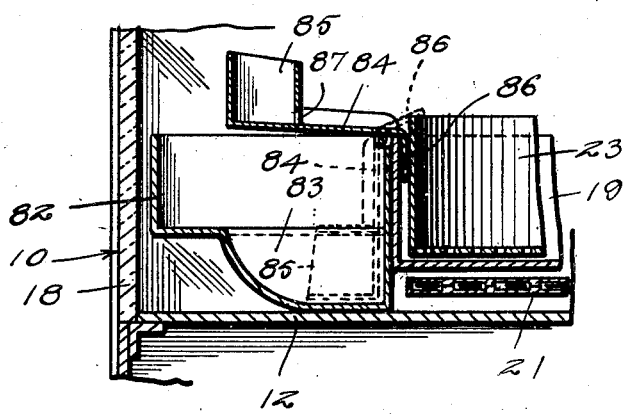
Figure 6 is a fragmentary vertical section on the line 6—6 of Figure 2.
Figure 13:
Figure 13 is a fragmentary section on the line 13—13 of Figure 2.
Figure 14:
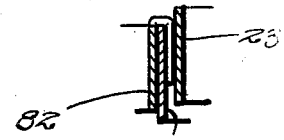
Figure 14 is a section on the line 14—14 of Figure 2.

For the purpose of salting the peanuts automatically as they are discharged over the chute 50, I provide a salt hopper designated generally 70 closed by a removable cover 71. The lower end of this salt receptacle 70 is formed to provide the hopper portion 72 having a square downwardly extending spout 73. Operating across this spout is the cut-off slide or valve 74 which is mounted in suitable guides and extends outward beyond the spout 73 and is there provided with the diagonal slot 75. Extending through the spout or mounted in coactive relation thereto is a rock shaft 76 having at one end a crank arm or finger 77 projecting into the slot 75. The rod 76 is mounted upon supports 76$^a$. One end of the rod is angularly bent as at 78 and screw-threaded as at 79 and engaging this screw-threaded portion of the rod is an adjustable tip 80. This is disposed, as illustrated in Figure 5, in the path of movement of the arm 30 when the arm is raised by the lifting of the nut basket. Normally the arm 78 with the tip 80 is held in a vertically depending position by means of the coil spring 81 which surrounds the rod 78 and is connected at one end to the support 77 and at the other end to the rod 76. This acts to return the slide 74 to its closed position. Now when it is desired to discharge the peanuts and the basket is lifted, the arm 30 is also lifted with the basket as previously explained and then in the rotation of the arm 30 which continues its operation all the time the basket is raised, the arm 30 will intermittently strike the tip 80, thus oscillating the rod 76 and causing the intermittent retraction of the slide or valve 74 permitting a certain amount of salt to be discharged down on to the nuts as they pass down the chute 50. I do not wish to be limited to the particular construction of the slide 74 as while I have illustrated this slide as being an imperforate slide, it is obvious that it might be made like an ordinary salt cellar slide or damper with perforations adapted when the slide is retracted to aline with the perforations in a plate just below the slide so that the salt will be scattered more generally upon the nuts below.

While I do not wish to be limited to this, I preferably provide automatic means for replenishing the melted butter or boiling oil or like liquid within the cooking tank 19 as a certain amount of this oil is absorbed by the nuts and discharged therefor with them. To this end, I provide a melted butter or oil receptacle generally designated 82 which is preferably mounted upon the side wall of the tank 19. This receptacle has a sump 83 formed in its bottom, the sump having a curved bottom. Pivoted upon the inside wall of the receptacle 82, which inside wall is disposed adjacent the wall 19 is the shank 84 of a dipper 85 which is so formed that when the dipper is lowered, it will dip down into the sump. The end of this shank 84 is angularly bent as at 86 and this extension or arm 86 projects into the path of movement of the basket 23. Therefore, as the basket moves downward after having discharged the nuts, the dipper will be raised. The handle or shank 84 of the dipper is in the form of a trough and the inner wall of the dipper is formed with an opening 87 discharging into this trough. Therefore, as the dipper is raised, the liquid contained within the dipper will be discharged out along the trough-like shank 84 and into the cooking receptacle or tank 19.

For the purpose of regulating the amount of liquid which the dipper shall contain as it lifts, I provide one end wall of the dipper with a slot 88 and provide a slide 89 movable in guides 90 across said slot, this slide being provided with a handle 91. If this slide is depressed so as to uncover the open end of the slot 88, the dipper will contain a less amount of liquid than if the slide be fully raised and by adjusting this slide, the amount of liquid which will be contained within the dipper and be discharged therefrom may be regulated.

The heating element 21 is shown in detail in Figure 9. This may be of any suitable construction but is illustrated as having a plurality of heating wires or resistance elements 92 embedded in refractory material 93. This is a three-heat heating element so that any desired temperature may be secured for the cooking tank by adjusting the switches 25 on the switch panel. The heating element is disposed very close to the bottom of the tank 14 and, therefore, is cut away at 94 for the downward recess 70 in the bottom of the tank. Preferably, there will be a fume vent 95 which will extend down through the top 13 of the outer casing and down through the hopper 15, which fume vent carries off the fumes of boiling oil from the interior of the compartment defined by the floors 12 and 14.

While the chute 50 may discharge the nuts into any suitable receptacle, I have shown in Figure 8 a storage dispenser unit which may be used and which is disposed upon a shelf 96. This storage dispenser is illustrated as cubical in form and having a removable cover 97 having a slot through which the chute 50 discharges. A swinging door 98 operates in an opening in front of the receptacle and above this hinged door is disposed a baffle plate 99.

Preferably, a heating element 100 is disposed beneath the metal shelf 96 so as to keep the nuts hot. The cover 97 is preferably of glass and the side walls are preferably of glass so that the contents may be observed.

While I have heretofore referred to the use of this device as a means for cooking nuts, obviously I do not wish to be limited to this as the mechanism might be used for cooking other food products in oil or butter, nor do I wish to be limited to the exact arrangement of the parts illustrated as these might be varied in many ways without departing from the spirit of the invention as defined in the appended claims.

It will be obvious, of course, that I do not wish to be limited to the particular heating means, though I have found that the electrical heating means is cleaner, better and more delicately regulatable than any other heating means known to me. Neither do I wish to be limited to many of the details of construction which might be modified in many ways without departing from the spirit of the invention as defined in the appended claims.

While I have used the term basket as a convenient term for the element 23 and as explanatory of its function, it will be obvious that I mean to include by this term any open top receptacle formed entirely or partially of perforated metal, reticulated metal, or other open-work structure. Preferably the side walls will be imperforate so as to entirely close the openings of the ducts 34 leading from the hopper but, of course, if the basket is of wire mesh and the mesh is small enough, the side walls would also prevent the passage of nuts from the ducts 34. Therefore, I do not wish to be limited to the exact construction of the basket as shown except as stated in the appended claims.

I claim:—

1. A nut cooker including a tank, a vertically movable basket coacting therewith, a hopper disposed above the tank and basket and having a duct leading therefrom, the opening of said duct being disposed just above the tank and into position to be closed by the side wall of the basket when the basket is raised, means for automatically at predetermined intervals raising and lowering the basket, and means for discharging cooked nuts from the basket when the basket is raised.

2. A nut cooker including a cooking tank, a vertically movable basket coacting therewith, a hopper disposed above the tank and having discharge branches opening each at a point above the tank but in position to have the openings closed by the side wall of the basket when the basket is raised, a cut off valve controlling the flow of nuts from the hopper into said branches, means for automatically closing said cut-off valve when the basket is lowered, and means for discharging nuts from the basket when the basket is raised.

3. A nut cooker including an annular cooking tank, an annular basket normally disposed within the tank, a vertical shaft extending through the center of the tank and basket and rotated at a constant speed, the shaft passing loosely through the center of the basket, an arm mounted upon the shaft to rotate therewith but vertically slidable with the basket upon the shaft, the arm carrying an agitator extending into the basket, a sleeve surrounding said shaft and slidingly mounted thereon, the shaft rotating freely within the sleeve, the upper end of the sleeve operatively carrying the basket, and means acting at predetermined intervals to raise said sleeve, basket and agitator, hold them raised for a predetermined time, and then lower the sleeve, basket and agitator into the tank.

4. A nut cooker of the character described, including an annular tank, heating means disposed below the tank, an annular basket normally disposed within the tank but vertically movable with relation thereto, a shaft extending upward through the center of the tank and basket, a sleeve loosely surrounding said shaft but movable vertically with relation thereto, the upper end of the sleeve carrying the basket, an agitator slidably mounted on the shaft but rotating therewith and operatively supported by said sleeve, the agitator having a blade disposed within the basket, a hopper having branches terminating above the outer wall of the basket, the openings of said branches being adapted to be closed when the basket is raised and opened when the basket is lowered into the tank, a cut-off valve acting when closed to cut off the passage of nuts from the hopper into said branches, means acting when the sleeve and basket are raised to open said cut-off valve to permit the discharge of nuts from the hopper into the branches, means acting when the basket is raised to permit the discharge of nuts from the basket over the side wall of the tank, and power operated means for constantly rotating said shaft at a predetermined speed and for intermittently raising said sleeve, holding it raised for a predetermined time and lowering the sleeve for a predetermined time.

5. A nut cooker of the character described, including an annular tank, heating means disposed below the tank, an anular basket normally disposed within the tank, but vertically movable with relation thereto, a shaft extending upward through the center of the tank and basket, a sleeve loosely surrounding said shaft but movable vertically with relation thereto, the upper end of the sleeve carrying the basket, an agitator slidably mounted on the shaft, but rotating therewith and operatively supported by said sleeve, the agitator having a blade disposed within the basket, a hopper having branches terminating above the outer wall of the basket, the openings of said branches being adapted to be closed when the basket is raised, and opened when the basket is lowered into the tank, a cut-off valve acting when closed to cut off the passage of nuts from the hopper into said branches, means acting when the sleeve and basket are raised to open said cut-off valve to permit the discharge of nuts from the hopper into the branches, means acting when the basket is raised to permit the discharge of nuts from the basket over the side wall of the tank, and power operated means for constantly rotating said shaft at a predetermined speed and for intermittently raising said sleeve, holding it raised for a predetermined time and lowering the sleeve for a predetermined time, said means comprising a power-operated cam and a bell crank lever, one end of which is connected to the sleeve and the other end of which is engaged by the cam.

6. A nut cooker of the character described, including an annular tank, means for heating the tank, an annular basket normally disposed within the tank and vertically movable with relation thereto, the basket having a discharge opening in its side wall normally closed by the tank, a downwardly swinging trap door forming part of the bottom of the basket immediately below said opening and resiliently urged to a position flush with the floor of the basket, the tank wall having a chute in alinement with the opening in the wall of the basket, a shaft extending vertically from the center of the basket and tank, a sleeve loosely surrounding the shaft and extending above the tank and at its upper end supporting the inner wall of the basket, an agitator slidingly mounted upon the shaft immediately above the sleeve but having rotative engagement with the shaft, the agitator having a blade disposed adjacent the bottom of the basket, means for discharging a predetermined portion of nuts into the basket when the basket is lowered, means for preventing said discharge of nuts when the basket is raised, means for depressing said trap door when the basket is raised out of the tank to thereby cause the discharge of nuts through the opening in the side wall of the basket on to said chute, and power operated means for constantly rotating the shaft and intermittently raising and lowering the basket at predetermined intervals.

7. A nut cooker including an annular tank, means for heating the liquid in the tank, an annular basket normally disposed within the tank and having an imperforate side wall, a hopper disposed above the basket and having branches extending downward and opening just above the top of the tank and in a position to be closed by the side wall of the tank when the latter is raised, a cut-off valve between the hopper and said branches, a shaft extending vertically through the tank and basket, a sleeve loosely mounted upon the shaft and at its upper end operatively supporting the basket, the shaft being free to rotate within the sleeve, an agitator slidably mounted on the shaft and extending down into the basket, the agitator having rotative engagement with the shaft, and being raised or lowered by said sleeve, a second sleeve disposed above the agitator and surrounding the shaft and and loose thereon, a bell crank lever connected to the cut-off valve and with one arm of which the second-named sleeve engages when said sleeve is raised to thus retract the cut-off valve and permit the discharge of nuts from the hopper into said branches, a spring urging the cut-off valve to its closed position, power operated means for constantly rotating said shaft and for intermittently raising and lowering the basket with relation to the tank, the basket wall having a discharge opening and the tank having a chute alining therewith whereby as the basket is raised, the agitator will sweep the cooked nuts out through said opening and on to said chute.

8. A nut cooker including a cooking tank, a vertically movable basket coacting therewith, means for automatically and at predetermined intervals raising and lowering the basket up from or into the tank, means for discharging a batch of nuts into the basket when it is lowered, means for discharging nuts from the basket when the basket is raised, and means actuated automatically upon the lifting of the basket from the tank to discharge salt upon the nuts as they are discharged from the basket, a chute down which the nuts pass when discharged from the basket, a salt hopper mounted above the chute and having a cut-off valve, an actuating member for the cut-off valve, and means connected to the basket for intermittently actuating said operating member for the cut-off valve as the basket is raised.

9. A nut cooker including an annular cooking tank, an annular basket normally disposed within the tank, but vertically movable with relation thereto, the basket having an imperforate side wall, the side wall at one point being formed with a discharge opening extending down to the bottom of the basket, the side wall of the tank at its upper edge being formed with a discharge chute and having inwardly extending lip, the basket having in its bottom immediately opposite said opening in its side wall a pivoted section constituting a trap door, a spring normally urging this pivoted section into a position flush with the bottom of the basket, the inwardly extending lip on the side wall of the tank engaging said trap door when the basket is raised to lower said trap door below the level of the bottom of the basket, means for intermittently raising and lowering the basket, an agitator rotatably mounted within the basket, but vertically movable therewith, said agitator having a blade extending tangential with reference to the center of the basket whereby when the basket is raised to sweep the contents of the basket into said depressed trap door and out of said chute.

10. A nut cooker including an annular cooking tank, an annular basket normally disposed within the tank, but vertically movable with relation thereto, the basket having an imperforate side wall, the side wall at one point being formed with a discharge opening extending down to the bottom of the basket, the side wall of the tank at its upper edge being formed with a discharge chute and having inwardly extending lip, the basket having in its bottom immediately opposite said opening in its side wall a pivoted section constituting a trap door, a spring normally urging this pivoted section into a position flush with the bottom of the basket, the inwardly extending lip on the side wall of the tank engaging said trap door when the basket is raised to lower said trap door below the level of the bottom of the basket, an agitator rotatably mounted within the basket, but vertically movable therewith, said agitator having a blade extending tangential with reference to the center of the basket whereby when the basket is raised to sweep the contents of the basket into said depressed trap door and out of said chute, a salt hopper disposed above said chute and having a cut-off valve, resiliently urged to a closed position, a shaft operatively connected to the cut-off valve to shift it to open position when the shaft is oscillated, the inner end of the shaft having a downwardly extending portion carrying a vertically adjustable tip, the tip being engageable by said agitator intermittently in its rotation.

11. A nut cooker including a cooking tank, a vertically movable basket therein, means for automatically raising and lowering the basket at predetermined intervals, means for agitating the nuts within the basket when the basket is lowered, means for discharging a predetermined amount of nuts into the basket when the basket is lowered into the tank, means for discharging the contents of the basket when the basket is raised out of the tank, and means operated by the basket upon a movement relative to the tank discharging cooking fluid into the tank each time that the basket is lowered.

12. A nut cooker including a cooking tank, a vertically movable basket therein, means for automatically raising and lowering the basket at predetermined intervals, means for agitating the nuts within the basket when the basket is lowered, means for discharging a predetermined amount of nuts into the basket when the basket is lowered into the tank, means for discharging the contents of the basket when the basket is raised out of the tank, and automatically operating means discharging cooking fluid into the tank each time that the basket is raised, including a liquid receptacle, a dipper pivotally supported upon the side wall of the tank and when the basket is raised dipping into said receptacle, the dipper having a handle formed to provide a duct for the liquid, and means actuated by the basket upon its lowering movement after acting to lift the dipper from the receptacle and discharging its contents along said handle into the tank.

13. A nut cooker including a cooking tank, a vertically movable basket therein, means for automatically raising and lowering the basket at predetermined intervals, means for agitating the nuts within the basket when the basket is lowered, means for discharging a predetermined amount of nuts into the basket when the basket is lowered into the tank, means for discharging the contents of the basket when the basket is raised out of the tank, and automatically operating means discharging cooking fluid into the tank each time that the basket is raised, including a liquid receptacle mounted upon the side wall of the tank, a dipper having a trough-shaped shank, the shank being operatively pivoted upon the side wall of the receptacle and having an angular extension extending over and down into the tank, and disposed in the path of movement of the basket, the dipper having an opening in its body discharging into the duct formed by said shank when the dipper is raised.

14. A nut cooker including a cooking tank, a vertically movable basket therein, means for automatically raising and lowering the basket at predetermined intervals, means for agitating the nuts within the basket when the basket is lowered, means for discharging a predetermined amount of nuts into the basket when the basket is lowered into the tank, means for discharging the contents of the basket when the basket is raised out of the tank, and automatically operating means discharging cooking fluid into the tank each time that the basket is raised, including a liquid receptacle mounted upon the side wall of the tank, a dipper having a trough shaped shank, the shank being operatively pivoted upon the side wall of the receptacle and having an angular extension extending over and down into the tank, and disposed in the path of movement of the basket, the dipper having an opening in its body discharging into the duct formed by said shank when the dipper is raised, one side wall of the dipper having an opening extending to the top edge of the dipper, and a sliding plate adapted to be adjusted to increase or decrease the length of said openings to thus regulate the amount of liquid which the dipper will contain.

15. A nut cooker including an annular cooking tank, an annular basket normally disposed within the tank and having a perforated bottom and an imperforate side wall, the side wall of the basket at one point being cut away from its top to its bottom to form a discharge opening normally closed by the tank when the basket is disposed within the tank, the bottom of the basket being cut away at a point radially disposed with reference to the opening of the side wall, the cut away portion having downwardly extending flanges, a trap door hinged at its inner end to said floor and forming part thereof and depressible between said flanges, a spring normally holding said trap door raised flush with the bottom of the basket, a chute extending from the top of the tank in alinement with the opening in the side wall of the basket and having an inwardly extending lid adapted when the basket is raised to engage the trap door to lower it, means for discharging a predetermined amount of nuts into the basket when the basket is lowered, a shaft extending upward through the basket and tank, a sleeve loosely surrounding said tank, and at its upper end engaged with the basket, an agitator disposed within the basket and having an arm loosely mounted upon the shaft but rotating therewith, power operated means for rotating said shaft and intermittently raising or lowering the sleeve, basket and arm, regulatable means for heating the liquid in the tank, and means actuated by said arm when the basket is raised for discharging salt to said chute.

16. A nut cooker including a cooking tank, a vertically movable basket movable therewith, means for automatically at predetermined intervals raising and lowering the basket up from or into the tank, means for discharging the nuts into the basket when it is lowered, means for discharging nuts from the basket when the basket is raised, and means actuated automatically upon the lifting of the basket from the tank to discharge salt upon the nuts as they are discharged from the basket including a chute down which the nuts pass when discharged from the basket, a salt hopper mounted above the chute, a slidable cut-off valve normally closing the bottom of the hopper, a rock shaft operatively connected to the cut-off valve, a spring urging the cut-off valve to a closed position, the extremity of the rock shaft having a downwardly extending member and an adjustable tip mounted upon the downwardly extending member of the rock shaft and a rotatable element movable vertically with the basket but rotatable therein adapted, as the basket is raised, to engage said tip on each rotation of the element to thereby intermittently oscillate the shaft and operate the cut-off valve of the salt hopper.

In testimony whereof I hereunto affix my signature.

HAROLD A. LEWEKE.